United States Patent [19]
Firestone et al.

[11] Patent Number: 5,906,151
[45] Date of Patent: May 25, 1999

[54] APPARATUS AND METHOD FOR BREWING AN ALCOHOLIC BEVERAGE AND BEVERAGE BREWED BY SAME

[75] Inventors: Adam Firestone, Solvang; Jeffers Richardson, Los Olivos; Donald E. Othman, San Luis Obispo; Michel A. Blom, Solvang, all of Calif.

[73] Assignee: Firestone Walker, LLC, Los Olivos, Calif.

[21] Appl. No.: 08/968,770

[22] Filed: Nov. 10, 1997

[51] Int. Cl.⁶ ..................................................... C12C 11/00
[52] U.S. Cl. .............................. 99/276; 99/277.1; 99/278; 426/11
[58] Field of Search .......................... 99/276, 277, 277.1, 99/277.2, 278; 426/11, 16, 600

[56] References Cited

U.S. PATENT DOCUMENTS

| | | | |
|---|---|---|---|
| 485,012 | 10/1892 | Kreusler | 99/276 |
| 490,056 | 1/1893 | Zwietusch | 99/276 |
| 504,145 | 8/1893 | Zwietusch | 99/276 |
| 554,851 | 2/1896 | Witteman | 99/276 X |
| 1,043,361 | 11/1912 | Romer | 99/276 X |
| 1,099,746 | 6/1914 | Heuser | 99/276 |
| 3,627,544 | 12/1971 | Bosewitz et al. | 99/276 |

*Primary Examiner*—Reginald L. Alexander
*Attorney, Agent, or Firm*—Jeffer, Mangels, Butler & Marmaro LLP

[57] ABSTRACT

An apparatus for brewing an alcoholic beverage includes a plurality of wooden barrels including at least one first wooden barrel, at least one second wooden barrel, and at least one third wooden barrel; an enclosed trough; a plurality of first conduits providing flow communication between each of the plurality of wooden barrels and the enclosed trough; an enclosed catch pot in flow communication with the enclosed trough; a plurality of second conduits providing flow communication between the enclosed catch pot and each of the plurality of wooden barrels; and devices, such as valves, for controlling flow between each of the plurality of wooden barrels and the second conduit. The at least one first wooden barrel is a new barrel that has been filled with an alcoholic beverage up to 5 times, the at least one second wooden barrel is a middle aged barrel that has been filled with an alcoholic beverage from 6 to 12 times, and the at least one third wooden barrel is an old barrel that has been filled with an alcoholic beverage from 13 to 30 times.

14 Claims, 3 Drawing Sheets

APPARATUS AND METHOD FOR BREWING AN ALCOHOLIC BEVERAGE AND BEVERAGE BREWED BY SAME

FIELD OF THE INVENTION

The present invention relates to apparatus and methods for brewing an alcoholic beverage, such as beer, and the beverage which is brewed by the methods and in the apparatus of the present invention.

BACKGROUND OF THE INVENTION

The brewing of beer and other alcoholic beverages is an ancient art. The brewing of beer using cask fermentation systems is disclosed in the following references. U.S. Pat. No. 504,145 to Zwietusch discloses closed loop manufacturing of beer using casks in which a component of the loop, pipe r, provides for pressure equalization as beer flows from a cask A through a filter apparatus D into a cask C. U.S. Pat. No. 485,012 to Kreusler discloses routing carbonic-acid ($CO_2$) gas that would otherwise escape to the atmosphere carrying volatile flavor components with it from a first series of interconnected casks to a second series of interconnected casks. The second series of interconnected casks contains a fluid not saturated or fully impregnated with carbonic-acid gas. The contents of the two series of casks are then intermixed. U.S. Pat. No. 490,056 to Zwietusch discloses another closed loop beer making system that incorporates the use of casks. Specifically, beer from casks labeled A is fed through a filter and into casks labeled C, under a first pressure and against a counter pressure which is greater than the inherent pressure exerted by the carbonic-acid gas within the beer, but less than the first pressure. U.S. Pat. No. 1,099,746 to Heuser discloses using chip casks in a closed loop system.

The use of the "Burton-Union" in England in the last century is known. The Burton-Union utilized 154 gallon oak barrels linked together in rows (a "Union") of pairs. A swan-neck tube from the bung hole of each barrel led to an open trough, or "barm-back," that ran the length of the 12 rows, centered above the barrels. At one end of the trough, and a few inches lower, sat a feeder which led to side rods on either side of the Union and which ran the length of the 12 rows and made connections to each barrel via side taps. The process began with fermenting wort being transferred to the Union after spending 30–50 hours in a primary fermenter. Once in the Union, the $CO_2$ produced in the barrels forced yeast and beer up through the swan-neck and into the open barm-back. The open barm-back, at a slight decline and attemporated, allowed the yeast to settle, while beer ran to the feeder and back to the barrels via the side rods under the force of gravity. Eventually most of the yeast settled into the open barm-back and fermentation ceased. The result was a "cleansing," or a separation of the yeast from the beer, and excellent pitching yeast for further brews. One hundred years later, very few if any brewers still use the Burton Union. The demise of the Union is explainable by the brewing industry's increasing reliance on more sanitary fermentation materials such as stainless steel. In contrast, wood is more absorbent and therefore more difficult to properly clean and sanitize when compared to stainless steel. Thus, despite the unique flavors obtained through wooden barrel fermentation, higher maintenance and cleaning costs forced the end of a great tradition.

Accordingly, there is a need for an apparatus and methods for brewing beer which utilizes wooden barrels to impart a pleasant flavor to the beer that a metal container or container of another type of material would not provide. There is also a need to provide a modern, sanitary, closed system for transferring the fermenting beer to and from the wooden barrels in the process off cleansing the beer during wooden barrel fermentation.

SUMMARY OF THE PREFERRED EMBODIMENTS

In accordance with one aspect of the present invention, there is provided an apparatus for brewing an alcoholic beverage. The inventive apparatus includes a plurality of wooden barrels including at least one first wooden barrel, at least one second wooden barrel, and at least one third wooden barrel; an enclosed trough; a plurality of first conduits providing flow communication between each of the plurality of wooden barrels and the enclosed trough; an enclosed catch pot in flow communication with the enclosed trough; a plurality of second conduits providing flow communication between the enclosed catch pot and each of the plurality of wooden barrels; and means for controlling flow between each of the plurality of wooden barrels and the second conduit. The at least one first wooden barrel is a new barrel that has been filled with an alcoholic beverage up to 5 times, the at least one second wooden barrel is a middle aged barrel that has been filled with an alcoholic beverage from 6 to 12 times, and the at least one third wooden barrel is an old barrel that has been filled with an alcoholic beverage from 13 to 30 times.

Preferably, the inventive apparatus includes two second conduits. A portion of the plurality of wooden barrels are in flow communication with one of the second conduits and the remainder of the plurality of wooden barrels are in flow communication with the other of the second conduits.

According to a preferred embodiment, a plurality of means for controlling flow are provided, one between each of the plurality of wooden barrels and the second conduit. In particular, a valve is provided between each of the wooden barrels and the second conduit.

In accordance with a further aspect of the present invention there is provided a method for brewing an alcoholic beverage. The method includes the steps of introducing a fermenting alcoholic beverage into a plurality of wooden barrels; flowing the alcoholic beverage from the wooden barrel via an enclosed trough into an enclosed catch pot under pressure generated in the alcoholic beverage by $CO_2$ produced by the fermentation; flowing the alcoholic beverage from the enclosed catch pot back into the wooden barrel under $CO_2$ pressure provided by a $CO_2$ source; and repeating these steps from 21 to 30 times.

Preferably, the plurality of wooden barrels includes at least one first wooden barrel that is a new barrel that has been filled with an alcoholic beverage up to 5 times, at least one second wooden barrel that is a middle aged barrel that has been filled with an alcoholic beverage from 6 to 12 times, and at least one third wooden barrel that is an old barrel that has been filled with an alcoholic beverage from 13 to 30 times, and each of the plurality of wooden barrels is replaced after it has been filled 30 times.

According to a preferred embodiment, in the second step yeast suspended in the alcoholic beverage settles to the bottom of the enclosed catch pot.

In accordance with a further aspect of the present invention there is provided an alcoholic beverage produced by the method set forth above.

The present apparatus has the advantage that it is sanitary due to its sealed design. It also provides for the collection of yeast in a central location (the catch pot) which makes filling and beer return convenient. The inventive apparatus also allows for complete in-place cleaning of the entire system.

The present inventive apparatus and method allows for the utilization of oak barrels in a brewing process that provides for an improved palate, hop maturity, unique flavors and aromas from the oak barrels, and characteristic fruitiness which results in a beer of intriguing complexity. The technical advantages of the present inventive apparatus are the bright beer, stable, consistent fermentations, good attenuation, and excellent, healthy pitching yeast. It has also been found that this apparatus improves the fullness of the palate, adds a hint of smokiness and caramel due to the toasted oak wood, smooths and matures the hop flavor, and lends a clean briskness to the finish. It has further unexpectedly been found that the wooden barrels can be used according to the invention for a longer time than previously believed before needing to be replaced, thus significantly reducing operating costs.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
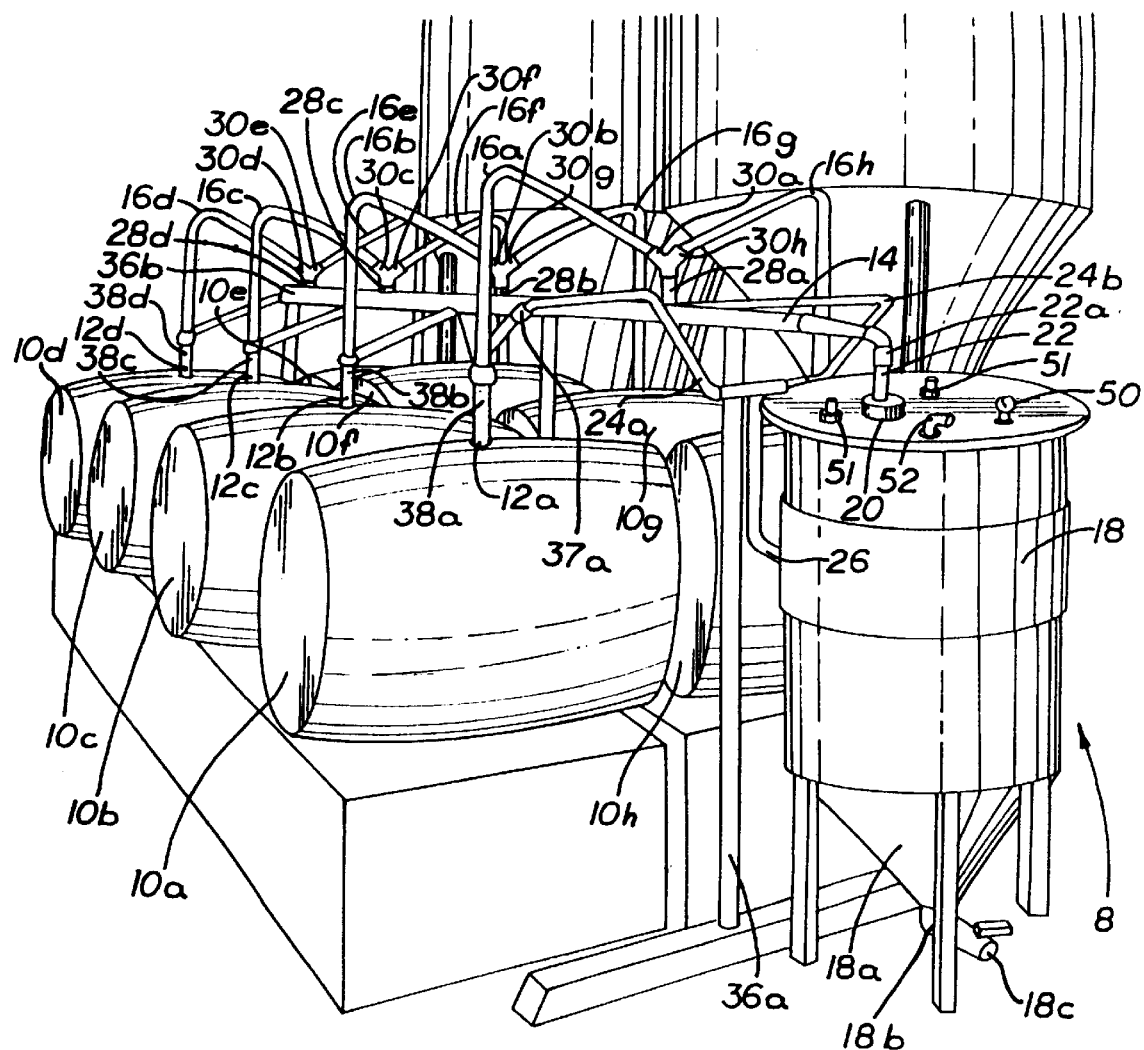
FIG. 1 is a perspective view of a particular embodiment of the apparatus of the present invention.
Figure 2:
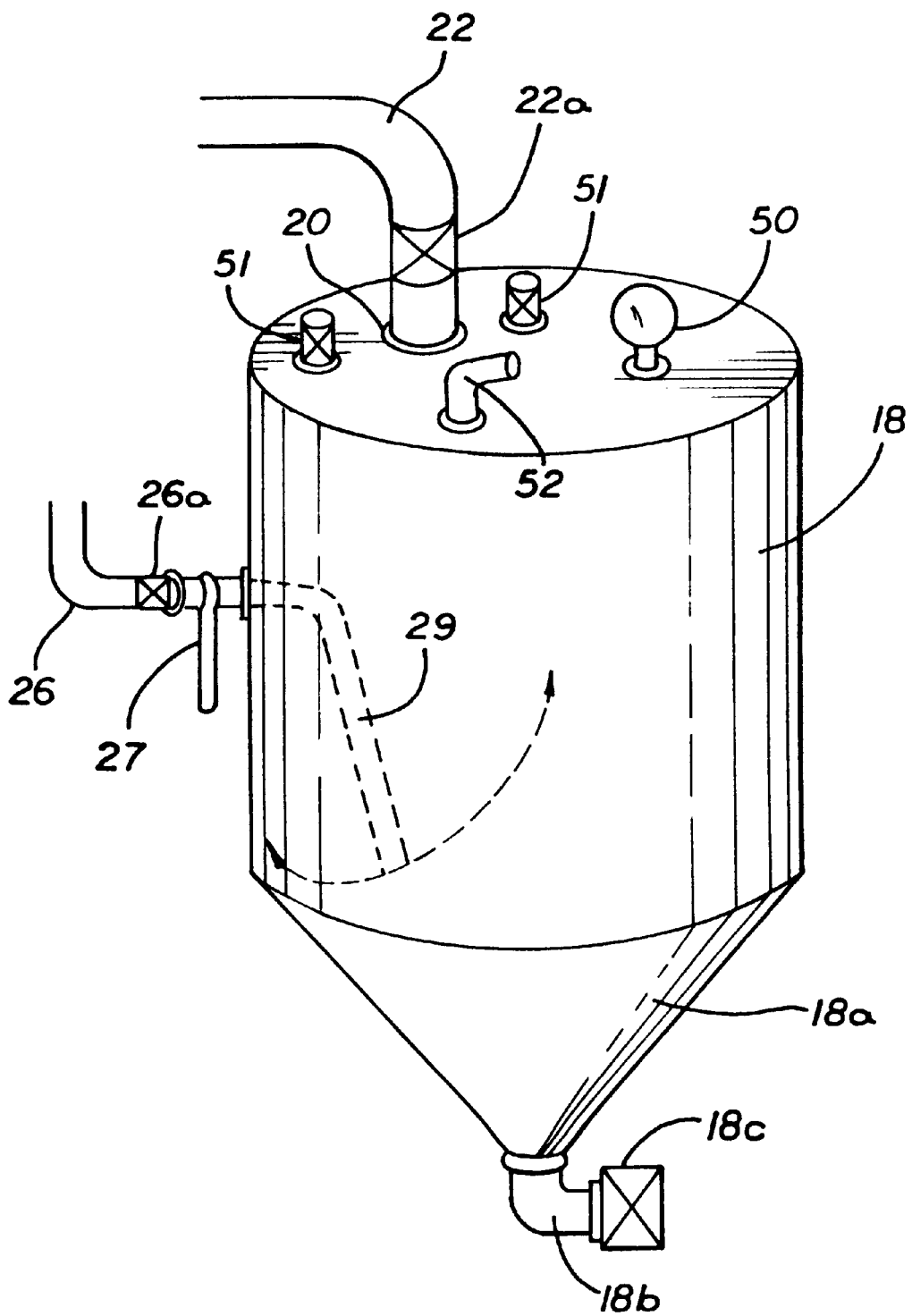
FIG. 2 is a perspective view of the catch pot of FIG. 1 with internal structure in phantom.
Figure 3:
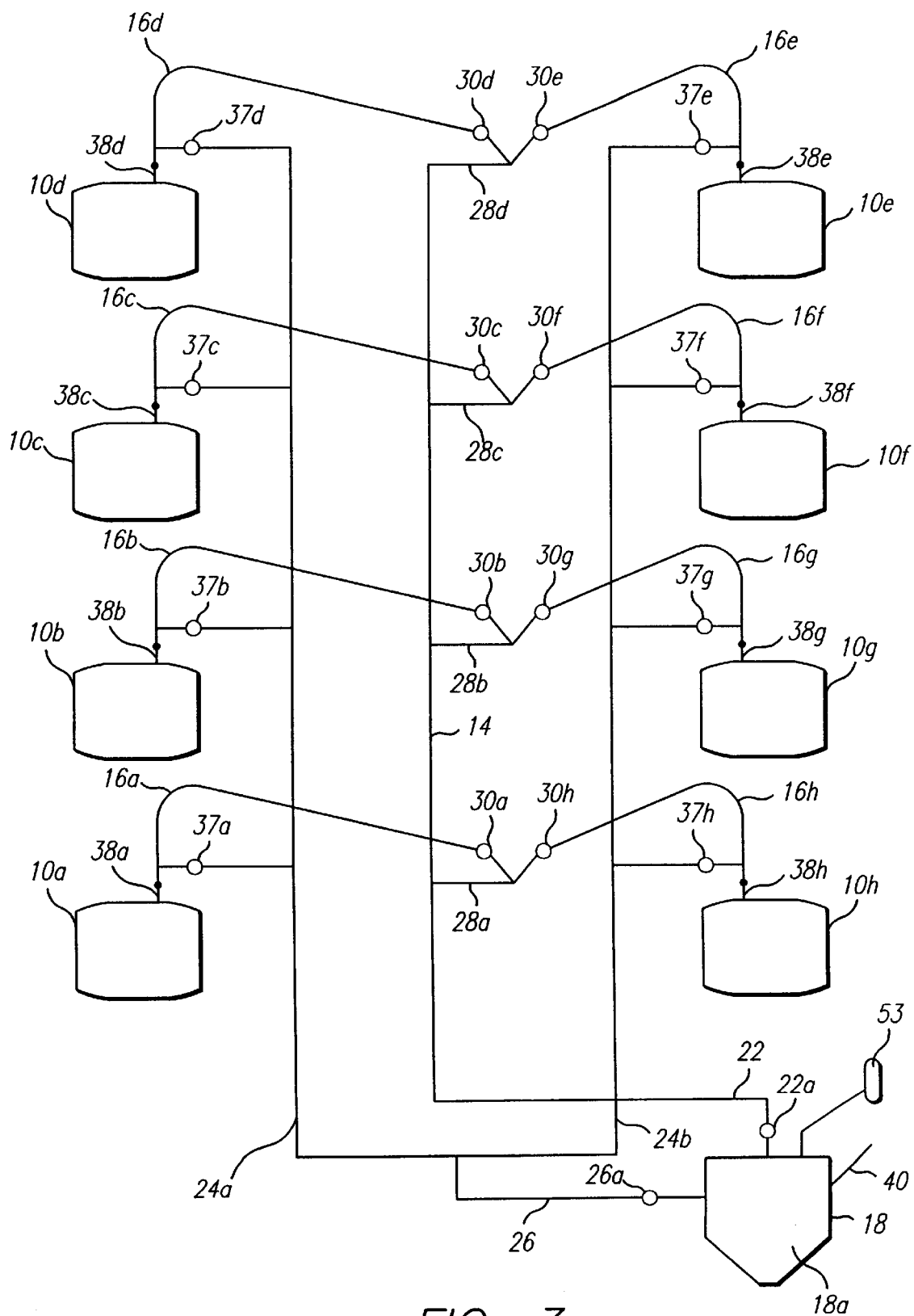
FIG. 3 is a schematic of the embodiment of FIG. 1.

In FIGS. 1–3, an apparatus 8 of the present invention includes wooden barrels 10a–h each having an opening 12a–h. An enclosed trough 14 is connected to each wooden barrel 10a–h by first conduits 16a–h which provides flow communication between wooden barrels 10a–h and enclosed trough 14. Enclosed catch pot 18 having an opening 20 is connected to enclosed trough 14 by a connecting member 22 having valve 22a. Pressure gauge 50 measures the pressure within enclosed catch pot 18. Relief valves 51 allow venting of enclosed catch pot 18 during fermentation. $CO_2$ inlet 52 connects to a source of $CO_2$ to enable pressurization of catch pot 18. Second conduits 24a–b provide flow communication between catch pot 18 and wooden barrels 10a–h. Flow control means 37a, preferably valves, control flow between the second conduits 24a–b and the wooden barrels 10a–h.

In the illustrated embodiment, connecting member 26 with valve 26a is disposed between catch pot 18 and second conduits 24a–b. If only one second conduit is employed, connecting member 26 may be combined with the second conduit to form a single conduit.

Enclosed trough 14 is supported by supporting legs 36a–b. First conduits 16a–h are connected to connecting members 28a–d, preferably with valves 30a–h interposed therebetween, and connecting members 28a–d are in turn connected to enclosed trough 14.

The inventive method and apparatus may be practiced in the following manner. An alcoholic beverage, preferably beer which has been fermenting in a primary fermenter, is transferred to the apparatus of the present invention. The term "beer" will be used throughout the specification; however, it is to be understood that other alcoholic beverages, such as scotch, bourbon and rye, can be produced by the present methods and apparatus, with subsequent distillation and without the use of hops. The recipe for the beer which has been fermented in the primary fermenter and the steps such as salt additions, hop additions and conditions such as mash temperature, liquid to grist ratio, type and amount of yeast used, fermentation temperature, and the like can be varied as would known to one of ordinary skill in the art.

The following is illustrative of typical primary fermentation conditions. Fermentation is carried out at a temperature of about 68° F. Wyeast Labs Special London Ale yeast can be used. The yeast is collected the night before or the morning of brew. The yeast is injected in-line during the transfer of wort from a whirlpool to the primary fermenter. An averages of 8–10 gallons of yeast slurry per 30.5 barrel brew is used. Peak yeast growth is between 24 hours and 48 hours after pitching. Minimum yeast cell count in the primary fermenter before transfer to the wooden barrels is about $2.8 \times 10^7$ cells/ml, and the average yeast count is about $2.5 \times 10^9$ cells/ml. The average pitch rate of the yeast is about $2.7 \times 10^7$ cells/ml.

A cylindroconical fermenter with a 60 barrel capacity and a 60 degree cone, can be used as the primary fermenter vessel.

About 1% to about 100% of the fermenting beer in the primary fermenter can be transferred to the apparatus of the present invention. More preferably about 5% to about 20% is transferred. In a most preferred embodiment, about 12% to about 15% of the fermenting beer is transferred. The transfer to apparatus 8 of the present invention is preferably done by batch process. The fermenting beer is transferred by gravity via, for example, one or more hoses or stainless steel pipes 40 (denoted schematically in FIG. 2, to enclosed catch pot 18 and under the hydrostatic pressure of the transferred beer is then fed through second conduits 24a–b to wooden barrels 10a–h. If the lengths of second conduits 24a–b increase such that the hydrostatic pressure of the beer is insufficient to insure flow to some of wooden barrels 10a–h, as can be determined by one of ordinary skill in the art, a positive displacement pump or preferably a diaphragm pump, which generates less shear force on the yeast, can be used.

Wooden barrels 10a–h are preferably constructed of oak most preferably American medium toasted oak barrels. Wooden barrels 10a–h are preferably a 60 gallon size. When 60 gallon barrels are used the width from bung to bung is 38.25 inches and the width from barrel end to end is 72 inches. The 60 gallon barrel which is typical in wine making proved to be unexpectedly advantageous, as the larger surface to volume ratio helped to maintain a constant temperature. Historically, brewers using the prior art recirculating brewing systems complained that different ambient temperatures produced inconsistent flavors. Scaling the present invention to smaller vessels helped eliminate the need for an open barm-back or trough which required open air for cooling or the use of additional cooling apparatus.

The enclosed trough 14 eliminates ambient temperature fluctuations and also prevents contamination. Additionally, 70 gallon barrels having the same dimensions as the 60 gallon barrels can be used.

The beer is transferred from wooden barrels 10a–h to enclosed trough 14 by first conduits 16a–h, also known in the art as swan necks. The transfer of beer occurs due to the increase in internal pressure caused by generation of $CO_2$ in the fermentation process and occurs almost immediately upon transfer of the beer to the barrels. In a specific embodiment of the present invention, first conduits 16a–h rise vertically to a height of about 70 inches above the floor, and then make a 135 degree bend from vertical downward toward enclosed trough 14. In a preferred embodiment first conduits 16a–h are connected at a first end to nickel plated bungs 38a–h, which are placed into openings 12a–h of wooden barrels 10a–h. In a preferred embodiment, first conduits 16a–h at a second end engage connecting members 28a–d placed between first conduits 16a–h and enclosed trough 14. Specifically, first conduits 16a–b engage connecting member 28a, 16c–d engage connecting member 28b, 16e–f engage connecting member 28c and 16g–h engage connecting member 28d. The height and angle of the first conduits 16a–h, as well as the number of such conduits, are matters of routine design for those skilled in the art.

Connecting members 28a–d preferably vary in height to account for the slope in enclosed trough 14, as described in more detail below. Preferably the connecting members 28a–d include valves 30a–h each of which can control the flow of beer. Preferably butterfly valves with tri-clamp fittings can be used. However, ball valves can also be utilized. Valves can be obtained from, for example, Definox, Tassilini and Triclover. Preferably first conduits 16a–h and connecting members 28 comprise stainless steel, preferably type 304 stainless steel and most preferably type 316 stainless steel. In one embodiment, first conduits 16a–h are about 1.5 inches in diameter.

The enclosed trough 14 receives fermenting beer from first conduits 16a–h. In a preferred embodiment enclosed trough 14 is tubular. In a more preferred embodiment enclosed trough 14 is about 3 inches in diameter, and in a most preferred embodiment is comprised of stainless steel. A pressure relief valve and/or a sampling port (not shown) can be provided on enclosed trough 14, preferably at a higher end, described below, of enclosed trough 14.

Enclosed trough 14 is sloped towards enclosed catch pot 18, so that an end of enclosed trough 14 distal or further from catch pot 18 is higher than an end of enclosed trough 14 proximal or closer to catch pot 18. This slope of enclosed trough 14 allows beer and yeast to flow to enclosed catch pot 18. The angle of this slope can vary from about 0.1° to about 20°. Preferably the angle of the slope is about 2° to about 4°. Preferably the angle of the slope is adjustable so that the angle of enclosed trough 14 can be adjusted in place. Most preferably enclosed trough 14 is connected to support legs 36a–b which are adjustable in height. A typical height from the floor to the top of enclosed trough 14 is about 55 inches. Enclosed trough 14 can be a single unitary piece or can be constructed of sections. In one embodiment enclosed trough 14 comprises two sections, one section 52.25 inches long and the other section 67.5 inches long. This length of enclosed trough 14 is sufficient to accommodate four 60 gallon barrels positioned adjacent to each other on one side of enclosed trough 14 and four 60 gallon barrels positioned adjacent to each other on the other side of enclosed trough 14, as illustrated in FIG. 1. By lengthening enclosed trough 14 additional barrels could be adjacently accommodated. Alternatively, additional barrels could be stacked in racks and connected to an unextended enclosed trough 14. The present invention can be adapted so that it can be used with a single wooden barrel up to any number of barrels desired to provide a given volume of beer. Preferably, at least two barrels are used and the number of wooden barrels is increased by multiples of two such that a pair of barrels are placed opposite to each other which allows for an efficient use of space in the connection of a pair of wooden barrels to enclosed trough 14. However, other configurations using a sealed beer circulating system and wooden barrels are within the scope of the invention.

Catch pot 18 can be obtained from suppliers of brewing equipment. In a preferred embodiment a 15.5 gallon cylindroconical fermenter vessel is used as catch pot 18. In a preferred embodiment catch pot 18 includes cooling jackets which can refrigerate the contents of enclosed catch pot 18. Beer, yeast, and other material is directed to catch pot 18 from the fermenting beer in wooden barrels 10a–h via sealed conduits 16a–h and downward sloping enclosed trough 14. Yeast settles out and separates from the beer in enclosed catch pot 18. When eight 60 gallon wooden barrels are used the cooling jackets need not be used as the temperature does not vary greatly, but is typically between about 69° F. to about 75° F. At this temperature a fruity character is imparted to the beer and oak extraction of flavor into the beer occurs.

The beer is returned to wooden barrels 10a–h through second conduits 24a–b via connecting member 22 and valve 22a, which is opened to allow flow. Internal racking arm 27 rotatably connected to connecting member 22 is movable by means of handle 29 to so only the beer pulled from catch pot 18 but yeast at the bottom of catch pot 18 is not pulled. Preferably a flow connection is provided between second conduits 24a–b and vertical sections of the first conduits 16a–h, as depicted in FIGS. 1–2. Most preferably the flow control means, such as valves 37a–h, are disposed between the vertical sections of first conduits 16a–h and second conduits 24a–b as shown in FIGS. 1–2. Preferably Definox butterfly valves with tri-clamp fittings are used.

The apparatus is under pressure during peak fermentation, but decreases to zero quickly. Once fermentation and aging cease in about 6 to about 7 days, $CO_2$ pressure at about 8 to about 10 psi, supplied from a source of $CO_2$ 53 (shown schematically in FIG. 3), is used to gently move the beer from catch pot 18 to wooden barrels 10a–h. Individual wooden barrels can thereby be "topped up" by opening and closing valves 37a–h. Pressure within the apparatus can be monitored by a pressure gauge located on, for example, enclosed catch pot 18. As is conventional in the art, a blow off tube can be installed to release excess pressure from the catch pot when pressure builds up. Yeast can be retrieved or dumped from the lower conical portion 18a of enclosed catch pot 18 via outlet 18b and valve 18c.

In a preferred embodiment of a method of the present invention, the following cleaning regimen and barrel rotation method can be used to provide a stable and consistent flavor to the beer. The wooden barrels 10a–h having been emptied of beer which has completed the brewing process are turned over and rinsed with a jet of warm water from a spray ball inserted into openings 12a–h, also known in the art as bung holes. The water temperature is increased to about 140° F. for about ten minutes of cleaning, and the temperature is again increased to about 180° F. to about 190° F. for about 10 additional minutes of cleaning. Wooden barrels 10a–h are either filled immediately, or sulfur matched if they will not be filled until the following day. The wooden barrels 10a–h can be emptied and cleaned about 15 to about 30 times, more particularly 21 to 30 times, before they must be replaced. Preferably, the number of times each of the wooden barrels is used is staggered so that there are new barrels used about 0 to about 5 times, middle aged barrels used about 6–12 times and old barrels used about 13–30 times being used simultaneously, best allowing for consistent oak flavor and aroma in the beer.

The beer which, after 6–7 days is removed from wooden barrels 10a–h, is reunited, in conditioning or maturation tanks with the beer that fermented in the primary fermenter. The beer is emptied from wooden barrels 10a–h by, for example, a Bulldog pump using pressure to move the beer from wooden barrels 10a–h to the maturation tank. The beer preferably is emptied via valves 37a–h. The beer so removed thus is not exposed to the external atmosphere. In the maturation tank the flavors and aromas developed in the inventive apparatus marry with beer that went through a standard fermentation in stainless steel vessels.

No additional fining occurs until filtration. Silica hydrogels are used to precipitate haze forming proteins prior to sterile filtration as is known in the art. The beer is then ready for bottling using standard equipment and techniques.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An apparatus for brewing an alcoholic beverage, comprising:
   a) a plurality of wooden barrels including
      i) at least one first wooden barrel,
      ii) at least one second wooden barrel, and
      iii) at least one third wooden barrel;
   b) an enclosed trough;
   c) a plurality of first conduits providing flow communication between each of said plurality of wooden barrels and said enclosed trough;
   d) an enclosed catch pot in flow communication with said enclosed trough;
   e) a plurality of second conduits providing flow communication between said enclosed catch pot and each of said plurality of wooden barrels; and
   f) means for controlling flow between each of said plurality of wooden barrels and said second conduit,
   wherein said at least one first wooden barrel is a new barrel that has been filled with an alcoholic beverage up to 5 times, said at least one second wooden barrel is a middle aged barrel that has been filled with an alcoholic beverage from 6 to 12 times, and said at least one third wooden barrel is an old barrel that has been filled with an alcoholic beverage from 13 to 30 times.

2. The apparatus of claim 1 further comprising two second conduits, wherein a portion of said plurality of wooden barrels are in flow communication with one of said second conduits and the remainder of said plurality of wooden barrels are in flow communication with the other of said second conduits.

3. The apparatus of claim 1 wherein said means (f) comprises a plurality of valves, one of said valves being disposed between each of said plurality of wooden barrels and said second conduit.

4. The apparatus of claim 1 wherein said plurality of first conduits each include a valve for controlling flow between said plurality of wooden barrels and said enclosed trough.

5. The apparatus of claim 1 wherein said plurality of wooden barrels are comprised of oak.

6. The apparatus of claim 1 wherein said enclosed trough is comprised of stainless steel.

7. The apparatus of claim 1 wherein said enclosed trough slopes towards said enclosed catch pot such that an end of said enclosed trough distal to said catch pot is higher than an end of said enclosed trough proximal to said catch pot.

8. The apparatus of claim 7 wherein said slope of said enclosed trough is adjustable.

9. The apparatus of claim 8 wherein said slope of said enclosed trough is adjustable between about 0.1° and about 20°.

10. The apparatus of claim 8 wherein said slope of said enclosed trough is adjustable between about 2 and about 4°.

11. The apparatus of claim 1 wherein said enclosed catch pot is refrigerated.

12. A method for brewing an alcoholic beverage comprising the steps of:
   a) introducing a fermenting alcoholic beverage into a plurality of wooden barrels;
   b) flowing said alcoholic beverage from said plurality of wooden barrels via an enclosed trough into an enclosed catch pot under pressure generated in said alcoholic beverage by $CO_2$ produced by said fermentation;
   c) flowing said alcoholic beverage from said enclosed catch pot via a sealed conduit back into said plurality of wooden barrels under pressure of $CO_2$ provided by a $CO_2$ source; and
   d) repeating steps (a)–(c) from 21 to 30 times.

13. The method of claim 12 wherein said plurality of wooden barrels comprises at least one first wooden barrel that is a new barrel that has been filled with an alcoholic beverage up to 5 times, at least one second wooden barrel that is a middle aged barrel that has been filled with an alcoholic beverage from 6 to 12 times, and at least one third wooden barrel that is an old barrel that has been filled with an alcoholic beverage from 13 to 30 times, and wherein each of said plurality of wooden barrels is replaced after said wooden barrel has been filled 30 times.

14. The method of claim 12 wherein in step (b) yeast suspended in said alcoholic beverage settles to the bottom of said enclosed catch pot.

* * * * *